J. J. KANE.
THRUST BEARING.
APPLICATION FILED FEB. 2, 1920.

1,418,804.

Patented June 6, 1922.
2 SHEETS—SHEET 2.

Inventor
J. J. Kane
by
Attorney

UNITED STATES PATENT OFFICE.

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

THRUST BEARING.

1,418,804.  Specification of Letters Patent.  Patented June 6, 1922.

Application filed February 2, 1920. Serial No. 356,182.

*To all whom it may concern:*

Be it known that JOHN J. KANE, a citizen of the United States of America, residing at Milwaukee, in the county of Milwaukee and State of Wisconsin, has invented a certain new and useful Improvement in Thrust Bearings, of which the following is a specification.

This invention relates in general to bearings, and has particular relation to bearings, especially those of the thrust type, wherein special provisions are made for reducing friction through the production of a film of lubricating fluid under pressure between the relatively movable bearing surfaces.

It is an object of this invention to provide an improved thrust bearing wherein the parts of the relatively movable bearing elements are of special design and construction to facilitate the production and maintenance of the desired film of lubricating material under pressure between the active bearing surfaces during the operation of the shaft with which the bearing is associated.

It is a further object of this invention to provide a thrust bearing of improved design and construction wherein one of the relatively movable bearing elements includes a plurality of bearing pads or shoes of such design and construction and so mounted as to facilitate the formation and maintenance of a film of lubricating fluid under pressure during the operation of the movable bearing element and the shaft with which it is associated.

It is a further object of this invention to provide a thrust bearing of the above described type wherein the formation of a film of lubricating fluid under pressure is insured between the relatively movable bearing elements independently of the direction of rotation of the movable bearing element and the shaft with which it is associated.

These and other objects and advantages are attained by this invention, the various novel features of which will appear from the description and drawings, disclosing one or more embodiments of such invention, and will be particularly pointed out in the claims.

Figure 1:
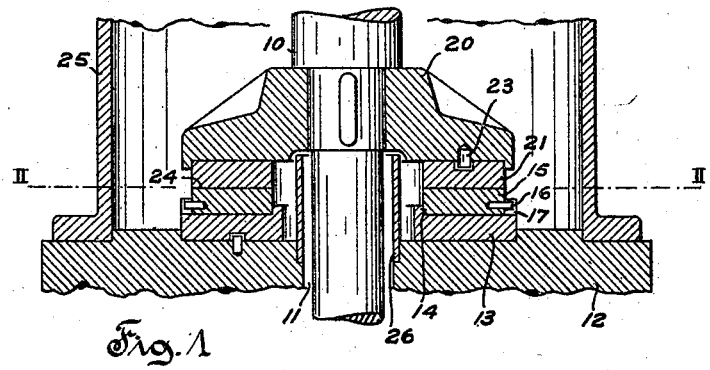
Fig. 1 is a fragmental sectional elevation of apparatus provided with a thrust bearing embodying features of this invention, the plane of section being that of the line I—I of Fig. 2.
Figure 2:
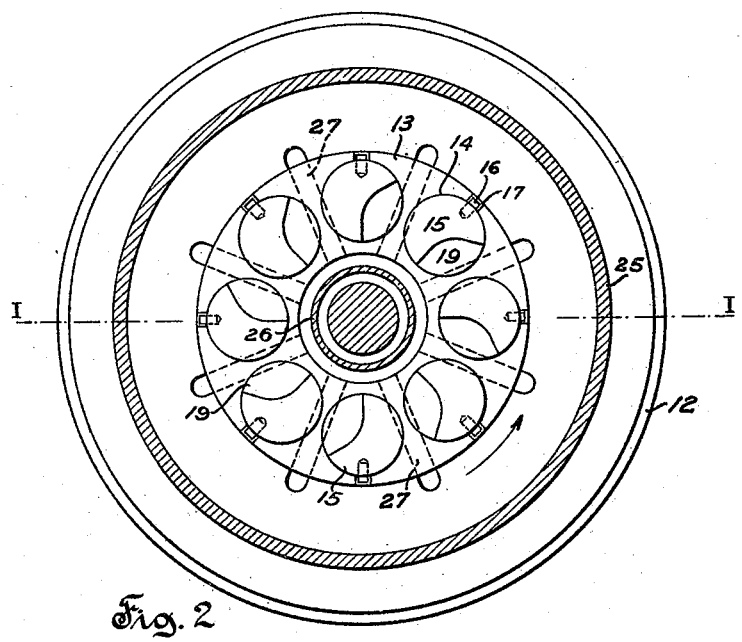
Fig. 2 is a sectional plan view along the line II—II of Fig. 1.
Figure 3:
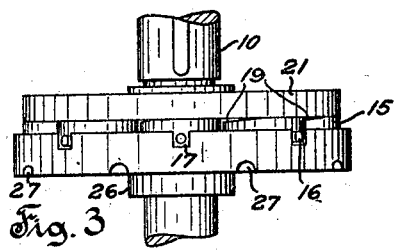
Fig. 3 is a view in elevation showing the bearing elements in the position occupied by them in Figs. 1 and 2.

In the embodiment of the invention disclosed in Figs. 1 to 3 inclusive, the shaft 10 of the machine, which may be considered a vertical shaft machine of any desired character, passes through a central opening 11 in a base or bearing support 12. An annular support or thrust collar 13, here shown as being in the form of a single piece annular collar, is mounted on the support 12, being held against rotation thereon in any suitable manner, as by means of a pin or dowel in one member cooperative with the walls of a slot in the other member, as indicated in Fig. 1. The annular base or thrust collar 13 is provided on its upper side with a plurality of recesses 14 of circular cross-section equally spaced about the collar, the number being here shown as eight. Bearing shoes or pads 15, of such size as to fit fairly closely within and be guided and maintained in position by the walls of the recesses 14, are mounted in these recesses, with a considerable portion of the shoes 15 extending upwardly beyond the upper face of the collar 13, as indicated. The shoes 15 are provided with projections 16 preferably adjacent the outer periphery thereof and which are disposed within slots 17 in the collar 13. These projections 16 serve to hold the shoes in relatively fixed positions, although allowing a slight rotative movement limited by engagement of the projections 16, with the walls of the slots 17.

Each of the shoes 15 is beveled or cut away, as indicated at 19, on what corresponds to the forward or leading side of the shoe, considering rotation of the shaft as indicated in Fig. 2. The circumferential dimensions of the beveled part 19 will depend to some extent upon the speed at which the shaft is to be rotated; but for ordinary speeds, satisfactory operating results may be attained when this cut away or bevel extends for about 120 degrees, with the inner radial edge of the bevel more or less nearly coincident with a radius of the shaft 10.

An annular support or thrust collar 20 is connected or otherwise fixed to the shaft 10 to rotate therewith and this collar carries or rests on an annular bearing element 21 which may be in the form of a single piece ring or collar, the bearing element being connected in driving relation with and held against appreciable movement relative to the support 20, as by means of a pin and slot arrangement, indicated at 23. This bearing collar 21 has a machined bearing surface 24 on its under side which cooperates with the bearing surfaces on the upper side of the bearing shoes 15. The thrust of the shaft 10 and parts rotatably associated therewith is transmitted to the support for the relatively fixed bearing elements through the cooperative engagement between the movable element 21 and the relatively fixed bearing shoes 15. In order to avoid any undesirable scraping between the relatively movable bearing surfaces, it may be preferable to slightly bevel or round the circumferential edges of the unbeveled portions of the bearing shoes 15.

A bearing housing 25 is supported by the bearing support 12, being spaced from the collar 13 and the bearing elements 15 and 21. The annular support 12 is provided at its inner edge with a cylindrical tube 26 secured in position, as by being threaded in the support, and this tube is of such dimensions as to be entirely free of the shaft 10 and to extend above the plane of engagement of the bearing surface 24 with the bearing surfaces of the shoes 15. The tube 26 thus acts as a dam for confining a body of oil in which the active bearing elements are immersed, the housing 25 being filled with oil to a point above the plane of the cooperative bearing surfaces of the fixed and movable bearing elements and below the upper edge of the tubular element 26.

The under side of the supporting collar 13 or the body portion of the annular support 12, or both parts, are provided with radial ducts 27 to provide fluid communication between the space between the active bearing elements and the tube 26 and the space outside of the active bearing elements and within the housing 25.

In operation, oil is free to circulate through the radial ducts or grooves 27 through or beneath the annular support 13, the normal flow through these ducts being radially inward, to the space radially within the bearing elements, whence it is thrown out by centrifugal force and the whirl or drag, caused by the rotating element of the bearing, through the spaces between the several bearing shoes 15 and also between the bearing surface 24 of the bearing element 21 and the beveled portions 19 of the bearing shoes 15. The action of the bearing in operation is such that there is a continuous circulation of oil inwardly through the ducts 27 and outwardly across the bearing surfaces. This action keeps the active bearing elements flooded with a fresh supply of comparatively cool oil.

During operation of the shaft, considerable pressure is put upon the oil in forcing or drawing the same from the space within the active bearing elements, and the pressure acting through the wedge shaped bodies of oil between the bearing surface 24 and the beveled surfaces 19 of the bearing shoes is sufficient to cause these bodies of oil to augment their effects as pressure wedges to an extent sufficient to actually lift the relatively movable bearing element 21 from actual contact with the bearing shoes 15 and float it upon a comparatively thin film of oil which is forced over the flat or unbeveled portions of the shoes 15. This film of oil is under sufficient pressure, under normal conditions of operation, to maintain its lifting or floating effect upon the movable bearing element 21 and permit the latter to rotate without actual metal to metal contact with the shoes 15 of the fixed bearing element. This is the desired action of this class of thrust bearings, for this floating of the movable bearing element out of actual engagement with the fixed bearing element through the action of the film of oil under pressure, causes a great reduction in the frictional losses of the bearing.

Figure 4:
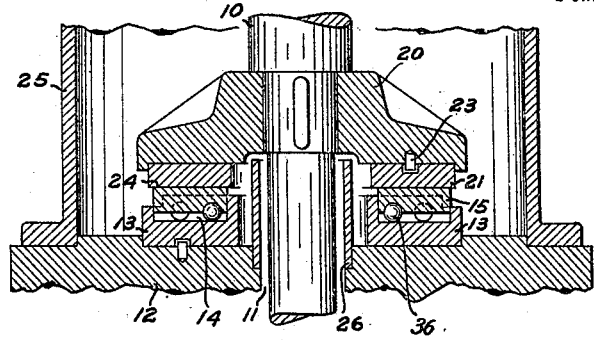
Fig. 4 is a view similar to Fig. 1 showing other features of this invention.

In the construction disclosed in Figs. 5 to 8, inclusive, the bearing element is modified to the extent that, while the bearing shoes 15 are of the same general form, as to the beveled portion 19, nevertheless, due to the manner of mounting the shoes, they are capable of considerably greater rotation about axes through their centers. These shoes 15 are provided with projections 32, as indicated, cooperative with either of the stop lugs or shoulders 34, 35 formed upon the supporting collar 13. Due to the fact that ease of rotation of the bearing shoes 15 is desirable in this type of bearing, the bearing shoes are preferably mounted upon ball bearings 36, as indicated in Fig. 4. The bearing balls are here shown as three in number for each of the bearing shoes and are confined in or occupy recesses in one or the other of the cooperative parts, the recesses being shown in the shoes 15. The rotative movement may be confined to a single axis through cooperation of the sides of the shoes with the walls of the recesses 14 of the supporting collar 13.

Figure 5:
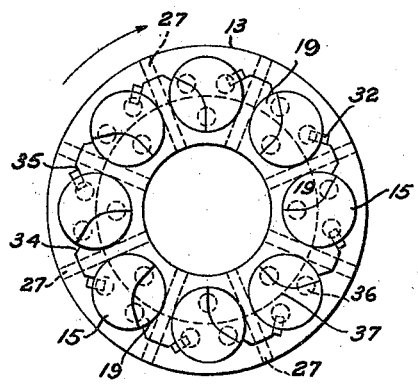
Fig. 5 is a plan view of the stationary bearing element of Fig. 4.
Figure 6:
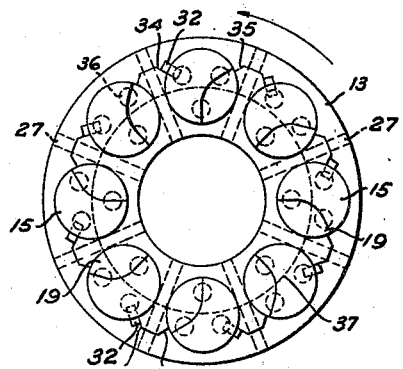
Fig. 6 is a view similar to Fig. 5, but with the bearing shoes of the stationary bearing element in the positions occupied by them during rotation of the shaft in a direction opposite to that indicated in Fig. 5.

The relative arrangement of the lugs or projections 32 and the stops 34, 35, and the position and extent of the beveled portions 19 of the bearing shoes 15 are preferably so selected that, even when the bearing shoes are in their extreme positions, as indicated in Figs. 5 and 6, a major portion of the unbeveled surface of each of the bearing shoes lies on the outer side of the circle of centers of these shoes, indicated by the circle 37. Through this design and construction, it will be apparent that, due to the fact that each of the bearing shoes is readily rotatable about its own axis and there is a greater bearing or drag of the movable element 21 upon the radially outer portions of the shoes than on the radially inner portions thereof, the bearing element 21 is effective to exercise a turning moment upon each of the disks and cause a rotation thereof about their axes to a position wherein the projections 32 engage with the projections 34 or 35, depending upon the direction of rotation. With the stops in these limiting positions, the beveled part 19 of each of the bearing shoes is brought into that position wherein it exercises its greatest effect in facilitating the production and maintenance of a pressure film of oil between the bearing shoes 15 and the rotatable bearing element 21 during the rotation of the latter.

Figure 7:
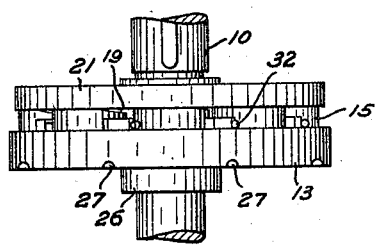
Fig. 7 is a view in elevation of the bearing elements with the parts as indicated in Figs. 4 and 5.
Figure 8:
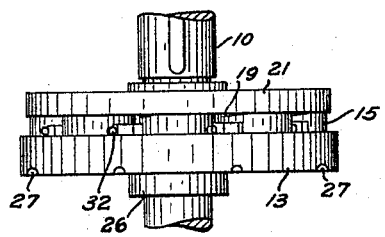
Fig. 8 is a view similar to Fig. 7, but with the parts in the positions indicated in Fig. 6.

In the operation of the modified construction, assuming that the bearing is at rest with the bearing shoes in the positions indicated in Figs. 5 and 7, if the shaft is rotated in the direction indicated by the arrow in Fig. 5, is will be apparent that the movable bearing element 21 will exert a turning moment upon the bearing shoes to maintain them in the positions indicated, with the beveled portions 19 in the position shown, wherein these beveled portions are most effective to receive wedge-shaped bodies of oil and produce pressure films over the entire bearing surfaces of the shoes.

Now, assuming that the bearing is at rest with the parts in the positions indicated in Figs. 4, 5 and 7, and the shaft is rotated in the direction indicated by the arrow in Fig. 6; the turning moment exercised upon the shoes 15 by the rotatable bearing element 21 is effective to rotate the bearing shoes about their axes to the positions indicated in Fig. 6, wherein the beveled portions 19 are most effective to cause the production of the desired pressure films between the bearing surfaces of the shoes and the bearing element 21 for this direction of shaft rotation.

A feature to be observed is that as the bearing shoes approach their most effective operating positions the resultant pressure exerted by the wedge-shaped films of oil, which is exerted in a direction that is a resultant of a radial force and one tangential to the bearing, is effective to assist in turning the shoes and in maintaining them in the desired position.

Another embodiment of the general arrangement shown in Figs. 4 to 8, inclusive, includes a bearing where the separate bearing shoes each has its bearing face in a single plane and is rotatable about an axis inclined outwardly from the axis of the rotating shaft. In this structure, the lower face of the shoe and its undercut seat in the annular support are inclined slightly from the horizontal and the part of the shoe that normally is above the lowest part of the seat, that is, the radially outermost part thereof, is thickest, so that, in the rotation of the shoe about its inclined axis, as during the initial rotation of the shaft, this thickest part of the shoe is rotated so as to be located at the trailing side of the shoe and thus leave a wedge-shaped space between the bearing face of the shoe and the cooperative bearing face of the movable bearing element, with the thickest part of the wedge at the leading edge of the shoe and the point of the wedge at the trailing edge of the shoe. It will be obvious that, with this arrangement, the desired film of oil under pressure will be developed and maintained between the cooperative bearing surfaces during the operation of the shaft.

It will be apparent that the design and construction of the bearing shown is such as permits rotation of the shaft in either direction and readily produces and maintains the desired pressure film of oil between the bearing surfaces independently of the direction of rotation.

While quite unnecessary in the ordinary construction, spring means may be associated with each of the bearing shoes 15 in such a manner as to be effective to bias and move the individual bearing shoes 15 to a position neutral to the two operating positions, indicated in Figs. 5 and 6, this neutral position being one wherein the central portion of the beveled part 19 is nearest to the shaft 10. The spring means may be so designed and mounted as to return the bearing shoes to this inoperative position when they are not subjected to a turning moment due to the rotation of the movable bearing element.

By mounting the supporting base or collar 13 upon a spherical seat, it will be apparent that one may secure automatic adjustment or compensation for unsymmetrical thrust of the movable bearing element upon the bearing shoes 15 of the relatively fixed bearing element.

While the above explanation may not be exact as to all details of the physical effects attending the development and maintenance of the film of lubricating material under pressure between the active bearing surfaces of the bearing elements, nevertheless, it is certain that desirable operating results may be secured with bearing structures embodying features of the present invention.

It should be understood that it is not desired that the invention claimed be limited to the exact details of construction shown and described, for various modifications may occur to a person skilled in the art.

It is claimed and desired to secure by Letters Patent:

1. A thrust bearing, comprising relatively rotatable bearing elements having cooperative bearing surfaces, one of said bearing elements comprising an annular supporting element, and a plurality of disk-shaped bearing shoes carried by said supporting element and supported thereon at spaced points and restrained from free bodily movement thereon while having a limited angular movement about an axis through the center of and substantially perpendicular to the bearing face of the disk, said disk having a portion cut away at its bearing face at a point corresponding to the leading edge thereof during operation of the bearing.

2. A bearing, comprising a support, and a plurality of independent, disk-shaped bearing elements movably mounted on said support, each of said bearing elements being movable about an axis passing through and at an angle to the bearing face of said element and having its bearing face beveled at a portion of its periphery corresponding to the leading edge thereof during operation of the bearing.

3. A bearing, comprising a support, and a plurality of independently mounted bearing elements carried by said support, each of said bearing elements being rotatable about an axis substantially perpendicular to its bearing face and having its bearing face beveled or cut away at a portion of its periphery corresponding to its leading edge.

4. A shaft bearing, comprising a support, a plurality of independently mounted bearing elements carried by said support and rotatable about axes substantially parallel to the axis of the shaft, the bearing face of each of said bearing elements being beveled or cut away at a portion of its periphery corresponding to its leading edge.

5. A shaft bearing, comprising a support, a plurality of independently mounted, disk-shaped bearing elements carried by said support, each of said bearing elements being rotatable about an axis at an angle to its bearing face and having its bearing face beveled at a portion of its periphery corresponding to its leading edge, and means for limiting the rotative movement of said bearing elements.

6. A shaft bearing, comprising a support, a plurality of independently mounted, disk-shaped bearing shoes carried by said support and each rotatable about an axis at an angle to its bearing face, each of said bearing shoes being beveled at a portion of its bearing surface corresponding to the leading edge thereof during the operation of said bearing, and means for limiting the rotative movements of said bearing shoes to less than 200 degrees.

7. A shaft bearing, comprising a support, and a plurality of independently mounted, disk-shaped bearing shoes carried by said support, said bearing shoes being mounted on recessed or undercut seats in said support, and each of said bearing shoes being rotatable about an axis substantially perpendicular to its seat and having its bearing face beveled or cut away at a portion of its periphery corresponding to the leading edge thereof during operation of said bearing.

8. A shaft bearing, comprising an annular support and a plurality of independent bearing shoes carried by said support, each of said bearing shoes having a peripheral portion of its bearing face beveled and being rotatable about an axis through itself to permit shifting of a major part of the beveled portion thereof from one side to another of the radius of the shaft which passes through the axis of said bearing shoe.

9. A shaft bearing comprising an annular support, a plurality of independent bearing shoes carried by said support, each of said bearing shoes having a peripheral portion of its bearing face beveled and being rotatable about an axis substantially parallel to the axis of the shaft to permit shifting of the central part of the beveled portion of the shoe from one circumferential side to the other of the radius of the shaft which passes through the axis of said shoe to accommodate for rotation of the bearing in either direction.

10. A shaft bearing comprising an annular support, a plurality of independent bearing shoes carried by said support, each of said bearing shoes having a peripheral portion of its bearing face inclined with respect to another portion thereof and being rotatable about an axis substantially perpendicular to the latter portion of the bearing surface to permit shifting of said shoe to a position wherein said inclined portion of the bearing face is at the leading side of said shoe for either direction of rotation of the shaft and means for limiting the rotation of said bearing shoes about their axes to less than 180 degrees.

11. A shaft bearing, comprising relatively rotatable bearing elements having co-operative bearing surfaces, one of said bearing elements comprising an annular supporting collar, and a plurality of independently mounted, disk-shaped bearing shoes carried thereby, each of said bearing shoes having a portion of its bearing face inclined to the general plane of engagement of the co-operative elements.

12. A shaft bearing, comprising relatively rotatable bearing elements having co-operative bearing surfaces, one of said bearing elements comprising an annular supporting collar, and a plurality of independently mounted, disk-shaped shoes carried thereby and provided with bearing surfaces for co-operation with the bearing surface of the other bearing element, each of said bearing shoes having a portion of its bearing face inclined to the general plane of engagement of the co-operative bearing elements and being rotatable about an axis through the center of and substantially perpendicular to the bearing surface of the shoe to shift the position of said inclined portion.

13. A thrust bearing, comprising relatively rotatable, co-operative bearing elements, one of said bearing elements comprising an annular support, and a plurality of independently mounted bearing shoes carried thereby, each of said shoes being beveled at a peripheral portion of its bearing face and being rotatable about an axis within itself through the co-operative engagement thereof with the other bearing element to insure that said beveled portion is at the leading side of the shoe independently of the direction of rotation of the movable bearing element.

14. A thrust bearing, comprising relatively rotatable bearing elements having co-operative bearing surfaces, one of said bearing elements comprising an annular support carrying a plurality of bearing shoes independently mounted in recessed seats in said support and each being rotatable about an axis within itself and substantially perpendicular to the general plane of engagement of the co-operative bearing surfaces of the relatively rotatable bearing elements and being beveled at its bearing face at one portion of its periphery, each shoe being rotatable about its axis through co-operative engagement between said shoe and the other bearing element to cause said beveled portion to be located at the leading side of the shoe for either direction of rotation of the movable element of the bearing.

15. A thrust bearing, comprising relatively fixed and movable bearing elements, said fixed bearing element comprising a support and a plurality of spaced, disk-shaped shoes mounted on said support and independent of one another, each of said shoes being rotatable about an axis passing through and at an angle to the bearing face of the shoe and presenting a wedge-shaped space between its bearing face at the leading edge thereof and the bearing face of the cooperative movable bearing element during normal operation of the bearing.

In testimony whereof, the signature of the inventor is affixed hereto.

JOHN J. KANE.